(12) United States Patent
Ziebart et al.

(10) Patent No.: US 12,195,869 B2
(45) Date of Patent: Jan. 14, 2025

(54) BRONZE LAYERS AS NOBLE METAL SUBSTITUTES

(71) Applicant: Umicore Galvanotechnik GmbH, Schwaebisch Gmuend (DE)

(72) Inventors: Robert Ziebart, Mutlangen (DE); Guenter Wirth, Boebingen (DE); Silvia Neuhaus, Schwaebisch Gmuend (DE); Stefan Mueller, Waldstetten (DE)

(73) Assignee: Umicore Galvanotechnik GmbH, Schwaebisch Gmuend (DE)

( * ) Notice: Subject to any disclaimer, the term of this patent is extended or adjusted under 35 U.S.C. 154(b) by 0 days.

(21) Appl. No.: 18/573,503

(22) PCT Filed: Jun. 30, 2022

(86) PCT No.: PCT/EP2022/068007
§ 371 (c)(1),
(2) Date: Dec. 22, 2023

(87) PCT Pub. No.: WO2023/275215
PCT Pub. Date: Jan. 5, 2023

(65) Prior Publication Data
US 2024/0287698 A1    Aug. 29, 2024

(30) Foreign Application Priority Data
Jul. 2, 2021  (DE) .................... 10 2021 117 095.8

(51) Int. Cl.
*C25D 3/58* (2006.01)
*B32B 15/01* (2006.01)
(Continued)

(52) U.S. Cl.
CPC ............. *C25D 3/58* (2013.01); *B32B 15/01* (2013.01); *C22C 9/02* (2013.01); *C22C 9/04* (2013.01);
(Continued)

(58) Field of Classification Search
None
See application file for complete search history.

(56) References Cited

U.S. PATENT DOCUMENTS

| 2001/0014407 A1 | 8/2001 | Mitsuhashi |
| 2006/0246353 A1 | 11/2006 | Guo |
| 2010/0147696 A1 | 6/2010 | Bronder |

FOREIGN PATENT DOCUMENTS

| DE | 102011121798 | 6/2013 |
| DE | 102011121799 | 6/2013 |
| DE | 102013106608 | 10/2014 |
| DE | 102018133244 | 6/2020 |
| EP | 1198001 | 4/2002 |
| EP | 1961840 | 8/2008 |
| EP | 2037006 | 3/2009 |

(Continued)

OTHER PUBLICATIONS

Cui, et al., Synthesis and characterization of co-electroplated Cu 2ZnSnS 4 thin films as potential photovoltaic material, 2011, pp. 2136-2140, vol. 95, Publisher: Solar Energy Materials and Solar Cells.

(Continued)

*Primary Examiner* — Kristy A Haupt
(74) *Attorney, Agent, or Firm* — Suzannah K. Sundby, Esq.; Canady + Lortz LLP

(57) ABSTRACT

The invention is directed to the use of electrolytic bronze deposits as substitutes for the noble metal electroplating of electronic circuits, e.g. for use in electronic payment cards and identity cards. The invention also relates to a novel layer sequence of bronze layers.

16 Claims, 2 Drawing Sheets

Figure 1:
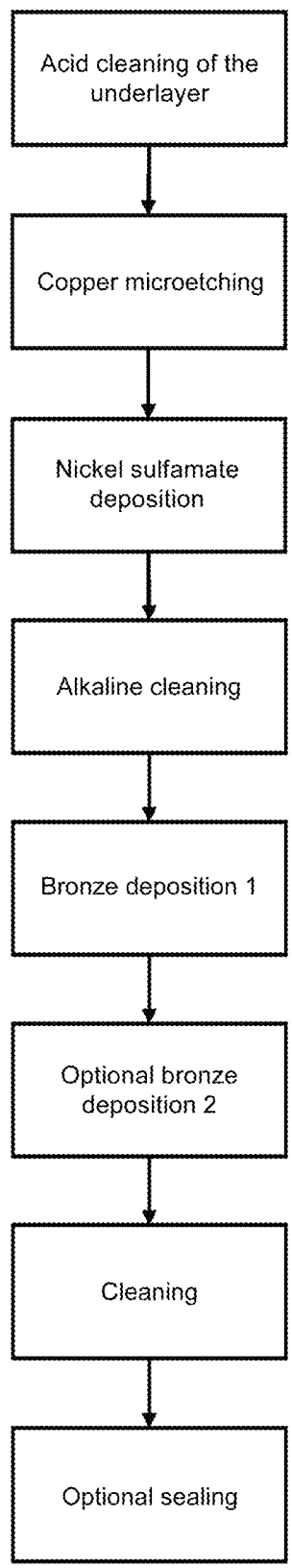

(51) Int. Cl.

| | |
|---|---|
| *C22C 9/02* | (2006.01) |
| *C22C 9/04* | (2006.01) |
| *C22C 13/00* | (2006.01) |
| *C22C 30/02* | (2006.01) |
| *C22C 30/04* | (2006.01) |
| *C22C 30/06* | (2006.01) |
| *C25D 5/10* | (2006.01) |
| *C25D 5/12* | (2006.01) |
| *G06K 19/077* | (2006.01) |

(52) U.S. Cl.
CPC .............. *C22C 13/00* (2013.01); *C22C 30/02* (2013.01); *C22C 30/04* (2013.01); *C22C 30/06* (2013.01); *C25D 5/10* (2013.01); *C25D 5/12* (2013.01); *G06K 19/07722* (2013.01)

(56) References Cited

FOREIGN PATENT DOCUMENTS

| EP | 2116634 | 11/2009 | | |
|---|---|---|---|---|
| EP | 2310558 | 4/2011 | | |
| EP | 2565297 | 3/2013 | | |
| EP | 2606164 | 6/2013 | | |
| EP | 2992126 | 3/2016 | | |
| EP | 3081673 | 10/2016 | | |
| EP | 3312309 | 4/2018 | | |
| EP | 3312309 A1 * | 4/2018 | .............. | C22C 9/00 |

OTHER PUBLICATIONS

"https://de.wikipedia.org/w/index.php?title=Galvanisch_Nickel&oldid=206755991", Electroplating nickel, Dec. 21, 2020, Publisher: Wikipedia.

Environmental testing—Part 2-60: Tests—Test Ke: Flowing mixed gas corrosion test, Jan. 1, 1996, Publisher: CENELEC.

Ennaoui, et al., Cu2ZnSnS4 thin film solar cells from electroplated precursors: Novel low-cost perspective, Feb. 2, 2009, pp. 2511-2514, vol. 517, No. 7, Publisher: Thin Solid Films.

"https://ep.umicore.com/storage/ep/umicoregt-list-of-products-april-2021.pdf", Global LEAP Electric Pressure Cooker Test Method, Version 1, Mar. 9, 2021, pp. 1-29, Publisher: Global LEAP Awards.

"https://de.wikipedia.org/wiki/Lab-Farbraum", Lab Color Space—EN ISO 11664-4, Aug. 9, 2021, Publisher: Wikipedia.

"https://en.wikipedia.org/wiki/Lead_frame", Lead Frame, Nov. 23, 2023, Publisher: Wikipedia.

"https://ts.kurtzersa.de/electronics-production-equipment/loetlexikon/begriff/leadframe.html", Leadframe, Unknown, Publisher: KurtzErsa.

Leuze, Eugen G., Praktische Galvanotechnik, Jan. 1, 2013, pp. 167-186, Publisher: Verlag KG.

Leuze, Eugen G., Praktische Galvanotechnik, Jan. 1, 2013, pp. 261-268, Publisher: Verlag KG.

Leuze, Eugen G., Praktische Galvanotechnik, Jan. 1, 2013, pp. 271-273, Publisher: Verlag KG.

Ma, et al., Photoelectrochemical hydrogen production on Cu2ZnSnS4/Mo-mesh thin-film electrodes prepared by electroplating, 2011, pp. 619-622, vol. 501, Publisher: Chemical Physics Letters.

"https://www.microchemicals.com/products/electroplating/ni_plating_solution_nb_semiplate_ni_100.html", NB SEMIPLATE NI 100, Unknown, Publisher: MicroChemicals.

"https://en.wikipedia.org/w/index.php?title=Smart_card&oldid=1009449492", Smart Card, Feb. 28, 2021, Publisher: Wikipedia.

"https://ep.umicore.com/storage/ep/umicoregt-list-of-products-april-2021.pdf", List of Products, Apr. 1, 2021, pp. 1-63, Publisher: Umicore Electroplating.

International Search Report received in PCT/EP2022/068007 mailed Oct. 28, 2022.

Written Opinion received in PCT/EP2022/068007 mailed Oct. 28, 2022.

* cited by examiner

BRONZE LAYERS AS NOBLE METAL SUBSTITUTES

The invention is directed to the use of electrolytic bronze deposits as substitutes for the noble metal electroplating in outer contact surfaces of electronic components, e.g. for use in electronic payment cards and identity cards. The invention also relates to a novel layer sequence of bronze layers.

The electrolytic deposition of brass (Cu—Zn alloy) and bronzes (Cu—Sn alloy) on consumer or decorative goods is well known (Praktische Galvanotechnik (Practical Electroplating), Eugen G. Leuze Verlag KG, 7th edition 2013, p. 261 et seq.). Among other things, they serve as a substitute for nickel-containing finishing layers and are applied to corresponding substrates at low cost, for example, in electroplating drum or rack coating methods.

In the deposition of brass and bronze layers, the solderability and, if applicable, their mechanical adhesion are critical properties that these producing layers have to exhibit. In electronic applications, the appearance of the layers is generally less important than their functionality. For the production of bronze or brass coatings on consumer goods, e.g. electronic payment cards, on the other hand, the decorative effect is also an important target parameter, in addition to the surface robustness and long durability of the coating while maintaining an appearance that is as unchanged as possible.

The deposition of a ternary alloy consisting of copper, tin and zinc is sufficiently known to the person skilled in the art. Deposition from a cyanide-free electrolyte is explained, for example, in EP 2116634. There, in addition to a high concentration of pyrophosphate anions in the electrolyte, a special reaction product of hexamethylenetetramines and epichlorohydrin is also used when the pH of the electrolyte is almost neutral. US20010014407 mentions in passing the deposition of a ternary alloy of Cu/Sn/Zn on copper surfaces as corrosion protection.

From US20100147696 it is known to deposit Cu—Zn—Sn alloy from electrolytes containing phosphonic acid. The deposits described therein give white coatings, which are, however, relatively low in zinc.

A cyanide-free, pyrophosphate-containing electrolyte for the deposition of ternary copper-zinc-tin alloys is described in Thin Solid Films, 517 (2009) 2511-2514. In this case, a layer not defined in detail is deposited from an alkaline electrolyte having the metals copper in the +2 oxidation state, zinc in the +2 oxidation state and tin in the +4 oxidation state.

EP 2037006 describes the electrolytic deposition of copper-tin-zinc alloys in a very specific atomic ratio to one another. The deposited layers have a composition which is intended to be close to the formula $Cu_2ZnSn$. The layers thus obtained can serve as the basis for producing kesterite (CZTS or $Cu_2ZnSn(S,Se)_4$), which is a promising material for producing photovoltaically active modules (Solar Energy Materials & Solar Cells 2011, 95, 2136-2140; Chemical Physics Letters 2011, 501, 619-622).

A leadframe is a carrier for semiconductors in the shape of a stamped strip. It is a solderable, metal lead carrier in the form of a frame or comb for automatic production of semiconductor chips or other electronic components. Aside from the chip carrier, the connecting pins of the future component are also integrated into the leadframe. Chips are die-bonded onto the leadframe. The contact surfaces of the chips are connected to the connecting pins via wire bonds. After the bonding, the leadframe is extrusion-coated with a thermosetting plastic. The connecting pins extend from the plastic housing and are subsequently cut and formed. (https://ts.kurtzersa.com/electronics-production-equipment/solderlexicon/begriff/leadframe-1.html). Leadframes are therefore the metal structures inside a chip package that transmit signals from the chip to the outside (https://en.wikipedia.org/wiki/Lead_frame). In addition, the term "leadframe" also refers to the shape of the microchips produced with leadframes, i.e. the shapes with (protruding) connections. Leadframes are mounted on an insulating carrier or in a package. If the contacts are mechanically fixed, they can be separated from one another. Leadframes are stamped, but can also be laser-cut for smaller quantities. They are used, for example, in smart cards or chip cards.

Smart cards, chip cards or integrated circuit cards are typically plastic cards that have a chip on their surface. These smart cards are known from ID cards, credit cards and the like. The integrated chip is controlled via various metal surfaces which establish contact with an external read/write device. An introduction can be found here: https://en.wikipedia.org/w/index.php?title=Smart_card&oldid=1009449492.

The contacts and metal surfaces mentioned above must be able to produce contact with the read/write device under very different ambient conditions. For instance, corrosive liquids must not affect the conductivity of the metal surfaces. Ideally, their external look and feel is also not negatively affected. For these reasons, very noble metals such as gold and palladium have been used in metal surfaces to date. Usually, the noble metal layers in these applications are deposited on other metal surfaces, in particular copper and nickel.

The use of expensive noble metals makes the leadframes or smart cards themselves expensive. It would therefore be an important and innovative step forward if the layers containing noble metals in the metal surfaces on these products could be substituted by less expensive but equally resistant, visually attractive metal surfaces.

These and further objects arising from the prior art for the person skilled in the art are achieved by the use according to the present independent claims 1 and 4, respectively. Preferred embodiments are illustrated in dependent claims 2 and 3 or 5 and 6.

By using electrolytically deposited bronze layers as layer substitutes as layer substitutes for galvanically deposited noble metal layers in outer contact surfaces of electronic components such as leadframes, wherein the layer has the following composition:

Cu 45-60%, Sn 30-50% and Zn 5-15% (in each case relative to the weight of the bronze layer); and/or Cu 70-90%, Sn 1-10% and Zn 5-30% (in each case relative to the weight of the bronze layer), the solution to the stated object is achieved. Surprisingly, the yellow or silver bronze layers are very similar in color to the gold or palladium layers to be substituted. They are also in no way inferior to noble metal layers in terms of processability and durability. Applied in this way, the noble metal layers otherwise present in e.g. the leadframes or chip cards can be eliminated, which makes the corresponding products more economical.

Advantageous embodiments contain the following compositions in the tin-rich bronze:

|    | Preferably in wt. % of the bronze layer | Particularly preferably in wt. % of the bronze layer |
|----|-----------------------------------------|------------------------------------------------------|
| Cu | 48-58                                   | 50-55                                                |
| Sn | 35-45                                   | 38-43                                                |
| Zn | 5-12                                    | 5-10                                                 |

Advantageous embodiments contain the following compositions in the copper-rich bronze:

|    | Preferably in wt. % of the bronze layer | Particularly preferably in wt. % of the bronze layer |
|----|-----------------------------------------|------------------------------------------------------|
| Cu | 75-85                                   | 78-83                                                |
| Sn | 2-8                                     | 2-6                                                  |
| Zn | 10-25                                   | 12-18                                                |

Figure 2:

Outer contact surfaces of electronic components such as leadframes are found in many products. Due to the rapid development of electronics in recent decades, semiconductors and leadframes have become essential components in almost every industry—in particular in automotive engineering. The power electronics required in electric and hybrid vehicles is just one example of how ubiquitous electronic systems are in industrial products in other industries. The person skilled in the art is aware of the other areas of application that can be considered in this respect. In particular, these leadframes are found in smart cards. Here, as stated previously, they are used to be able to connect a chip to a read/write device via a metal surface attached to the smart card. It is therefore advantageous to use bronze layers in particular for this application. FIG. 2 illustrates a corresponding smart card with a noble metal-containing gold surface as the contact surface.

According to the present invention, the bronze layer is applied to conductive substrates. The latter are immersed as a cathode in a bronze electrolyte and a current flow is established between the cathode and anode via an anode that is also in contact with the electrolyte. A person skilled in the art knows how to proceed here. Preferably, the bronze layer can be deposited in such a way on an underlayer selected from the group consisting of Cu, Ni, nickel-phosphorus, Pd, PdNi, Au and platinum. In a particularly preferred embodiment, the bronze layer may be deposited on a copper or nickel underlayer. A preferred layer sequence in the field of the use according to the invention consists of a metal, preferably copper, underlayer followed by a nickel layer and the bronze layer(s). FIG. 1 shows a very particularly preferred flow chart for the application of one or 2 bronze layers.

In a first step, the underlayer can be cleaned and etched. The person skilled in the art knows how to proceed here (Praktische Galvanotechnik (Practical Electroplating), Eugen G. Leuze Verlag KG, 7th edition of 2013, page 167 et seq.). Subsequently, a nickel layer is preferably applied to the underlayer. This ensures that the corrosion resistance of the overall system is improved. Here, too, the person skilled in the art is guided by sufficiently well-known procedures (https://de.wikipedia.org/w/index.php?title=Galvanisch Nickel&oldid=206755991). After another cleaning step, the first bronze layer is applied to the nickel layer. If an upper layer with a white appearance is desired, a bronze electrolyte is selected which allows a tin-rich bronze to be deposited as mentioned above. This top layer looks very similar to a palladium layer. If, however, the surface is to look more like gold, a copper-rich bronze alloy is deposited from a corresponding electrolyte. An electrolyte that can preferably be used for these purposes can be found in the following disclosed patent applications: EP1961840A1, EP2116634A1, EP2310558A1, EP2606164A1, DE102011121799A1, DE102011121798A1. Corresponding electrolytes are also commercially available, e.g. from Umicore Galvanotechnik GmbH under the name Miralloy® 2841 HS as a palladium substitute and Miralloy® 2847 1N HS as a gold substitute.

For the bronze electrolytes used, the colors of the respective surfaces can be decisively influenced by the choice of deposition parameters. For a bronze electrolyte leading to a white deposition, a tin-rich bronze electrolyte, such as Miralloy® 2841 HS, is preferably used. A high temperature during deposition, too high tin contents or a too high cyanide content in the electrolyte leads to a somewhat grayish deposition. High current densities or copper contents in the electrolyte as well as too high a pH value result in more yellowish deposits. Here, it is a matter for the person skilled in the art to select the suitable parameters in such a way that a deposition acceptable to him or her is produced. For a bronze electrolyte that leads to a golden yellow deposition, a bronze electrolyte richer in copper, such as Miralloy® 2847 1N HS, is preferably used. A high temperature during deposition, too high tin contents or a too high cyanide content in the electrolyte leads to a somewhat whitish, grayish deposition. High current densities or copper contents in the electrolyte as well as too high a pH value result in reddish depositions. Here, it is a matter for the person skilled in the art to select the suitable parameters in such a way that a deposition acceptable to him or her is produced.

With regard to the color of the bronze layers substituting the palladium (white) or gold (yellow) layer, it should be noted that they can be characterized in the Cielab system as follows. The deposited white (tin-rich) bronze metal layer advantageously has an L* value of over +84. The a* value is preferably −0.2 to 0.25 and the b* value between +2 and +4, according to the Cielab color system (EN ISO 11664-4—latest version as of the filing date). The values were determined with a Konica Minolta CM-700d. The deposited yellow (copper-rich) bronze layer advantageously has an L* value of over +97. The a* value is preferably −0.2 to 0.2 and the b* value between +2 and +4, according to the Cielab color system (EN ISO 11664-4—latest version as of the filing date). The values were determined with a Konica Minolta CM-700d.

The nickel underlayer mentioned above can be produced by a person skilled in the art (e.g. DE102018133244A1 and the literature cited therein). Preferably, such a nickel layer originates from a nickel sulfamate electrolyte. A bath for the deposition of nickel that has been known for a long time and is still in use today in a variety of modified forms is the nickel sulfamate bath with its basic components of 300-450 g/l nickel sulfamate, 0-30 g/L nickel chloride and 30-45 g/L boric acid (Praktische Galvanotechnik (Practical Electroplating), Eugen G. Leuze Verlag KG, 7th edition 2013, p. 272 et seq.). Others are commercially available, e.g. from Umicore Galvanotechnik GmbH under the name NIPHOS® 964 or NIPHOS® 964 HS, as well as e.g. here: https://www.microchemicals.com/de/produkte/galvanik/nickel_elektrolyt_nb_s emiplate_ni_100.html. The thickness of the nickel layer is to be determined by the person skilled in the art and should be between 2-4, preferably between 2.5-3.5 and very preferably between 2.75-3.25 μm for this application.

The thickness of the bronze layers can also be set by the person skilled in the art according to his or her preferences.

The white-looking bronze layer, which is considered a palladium substitute, preferably has a thickness of 0.1-2 µm, preferably 0.2-1 µm and very preferably 0.3-0.7 µm. The yellow-looking bronze layer, which is considered a gold substitute, preferably has a thickness of 0.1-2 µm, preferably 0.2-1 µm and very preferably 0.3-0.7 µm.

The present invention also relates to an advantageous layer sequence of at least one electrically conductive underlayer, a first bronze layer and a second bronze layer which differs from the first, at least in composition. Accordingly, the invention comprises a layer sequence having a metal underlayer and two successive, electrolytically deposited bronze layers, wherein one of these two layers has the following composition:

Cu 45-60%, Sn 30-50% and Zn 5-15% (in each case relative to the bronze layer);

and the other of these two layers has the following composition:

Cu 70-90%, Sn 1-10% and Zn 5-30% (in each case relative to the bronze layer). The preferred embodiments mentioned above with regard to the composition also apply mutatis mutandis here to the layer sequence.

Depending on which surface color is desired, the tin-rich or the copper-rich bronze layer can form the final surface layer. Preferably, the surface layer is the one with the more copper-rich, i.e., yellowish, alloy. For the depositions of the layers or underlayers, the statements made above about the use apply accordingly. The underlayers can also be selected and established by the person skilled in the art in accordance with the statements made above. For the thicknesses of the bronze layers, reference is also made to the statements made above. The bronze layers generally form the uppermost layers of the contact material. Finally, they are advantageously provided only with a transparent organic protective film, which is known to the person skilled in the art as anti-tarnish protection, topcoat and/or passivation. The person skilled in the art knows how to perform these steps (Praktische Galvanotechnik (Practical Electroplating), Leuze Verlag, 7th edition of 2013, page 167 et seq.). The application of anti-tarnish protection is a protective process for decorative noble metals, for example. This completely transparent layer in the nanometer range protects the base material from oxidation, discoloration and mechanical stress. The color and gloss are not affected. The coating is chemically resistant, dirt and water repellent and has a long service life.

The bronze layers presented here can easily substitute correspondingly more expensive noble metal surface layers without any problems, at least for the specified application. This leads to a drastic reduction in the cost of use, since noble metals are correspondingly expensive. In particular, gold and palladium surfaces can be advantageously substituted in this way. In tests, the present invention has proved surprisingly advantageous. Table 1 below shows corresponding tests and the results of a layer sequence according to the invention, as just mentioned, in comparison with standard gold or palladium surfaces. Compared to gold or palladium, the bronze depositions offer lower scratch sensitivity, comparable resistance in the required corrosion tests and an almost identical appearance.

TABLE 1

Comparison of surfaces for smart card applications

| Tests | Specification | Test details | Bronze | Au | Pd |
|---|---|---|---|---|---|
| Salt water test | ISO 10373-1 | 24 h | (.+++.) | (.++.) | (.+.) |
| Solderability | IPC J-STD-003B | >96% surface wetting | ok | ok | ok |
| Scratch test | ISO 7816-1 and simple pen cap test | metal pin/pen cap | (.+++.) | (.+.) | (.++.) |
| Resistance | ISO 7816-1 | <0.5 Ohm before/after | ok | ok | ok |
| 4K noxious gas test | EN 60068-2-60 | 96 h | (.++.) | (.+++.) | (.+.) |
| Pressure Cooker Storage Test | IPC-TM-650 Method 3.4.8.3 | | ok | ok | ok |
| SO2 wet test | ISO 6988 | 24 h | ok | ok | ok |
| Chemical resistance: | ISO 10373-1 | | ok | ok | ok |
| NaCl 5% | short term | 1 min | ok | ok | ok |
| AcOH 5% | short term | 1 min | ok | ok | ok |
| Na2CO3 5% | short term | 1 min | ok | ok | ok |
| EtOH 60% | short term | 1 min | ok | ok | ok |
| Sugar 10% | short term | 1 min | ok | ok | ok |
| Fuel B | short term | 1 min | ok | ok | ok |
| Glycol 50% | short term | 1 min | ok | ok | ok |
| Sweat (basic) | long term | 24 h | ok | ok | ok |
| Sweat (acidic) | long term | 24 h | ok | ok | ok |

In order to detect the susceptibility of a coating or the entire layer structure to corrosion, the 4-component noxious gas test was used for testing.

The 4-component noxious gas test (EN 60068-2-60) consisting of SO2, NO2, Cl2, H2S, which is also performed in a special noxious gas air conditioning system.

The Pressure Cooker Storage Test (https://storage-.googleapis.com/verasol-assets/Global-LEAP-EPC-Test-Method_v1.pdf) is a delamination test usually performed on printed circuit board products at high pressure and temperature. Outgassing from the deposited layers, which can lead to delamination of the deposited layers, is also detected with this test.

From the list in Table 1, it is apparent that the lower-cost bronze layers can certainly substitute the noble metal layers without causing any adverse effects for use in the area of application under consideration here. This was by no means to be expected on the priority date.

The following methods have been found to be particularly successful in connection with the present invention:

Method Step 1:
1a) base material (e.g. a copper clad L/F smart card foil)+copper activation (micro copper etching to remove copper oxides)+1-2 μm nickel+0.5-1 μm white bronze+anti-tarnish protection/topcoat/passivation (a transparent organic protective film).
1b) base material (e.g. a copper clad L/F smart card foil)+copper activation+1-2 μm nickel+0.5-1 μm white bronze
1c) base material (e.g. a copper clad L/F smart card foil)+copper activation+0.2-1 μm white bronze+anti-tarnish protection/topcoat/passivation.
1d) base material (e.g. a copper clad L/F smart card foil)+copper activation+0.2-1 μm white bronze Method Step 2:
2a) base material (e.g. a copper clad L/F smart card foil)+copper activation+1-2 μm nickel+0.2 μm-1 μm yellow bronze+anti-tarnish protection/topcoat/passivation.
2b) base material (e.g. a copper clad L/F smart card foil)+copper activation+1-2 μm nickel+0.2 μm-1 μm yellow bronze.
2c) base material (e.g. a copper clad L/F smart card foil)+copper activation+0.2 μm-1 μm yellow bronze+anti-tarnish protection/topcoat/passivation.
2d) base material (e.g. a copper clad L/F smart card foil)+copper activation+0.2 μm-1 μm yellow bronze.
2e) base material (e.g. a copper clad L/F smart card foil)+copper activation+1-2 μm nickel+0.5-1 μm white bronze+0.2 μm-1 μm yellow bronze+anti-tarnish protection/topcoat/passivation.
2f) base material (e.g. a copper clad L/F smart card foil)+copper activation+1-2 μm nickel+0.5-1 μm white bronze+0.2 μm-1 μm yellow bronze.
2g) base material (e.g. a copper clad L/F smart card foil)+copper activation+0.5-1 μm white bronze+0.2 μm-1 μm yellow bronze+anti-tarnish protection/topcoat/passivation.
2h) base material (e.g. a copper clad L/F smart card foil)+copper activation+0.5-1 μm white bronze+0.2 μm-1 μm yellow bronze.

EXAMPLES

The following layers were electrolytically applied to a polyimide foil laminated pre-structured copper foil:
- a layer of nickel with a thickness between 1-2 μm;
- a layer of white bronze e.g. Umicore Miralloy 2841 HS with a thickness between 0.1-2 μm;
- or a layer of yellow bronze e.g. Umicore Miralloy 2847 1N HS with a thickness between 0.1-2 μm;
- or a combination of both these white and yellow bronze processes with a thickness between 0.1-2 μm in each case.

The person skilled in the art will proceed with the above embodiment as shown in FIG. 1, but preferably as follows:
1. Preparing, cleaning and activating the substrate
2. Deposition of an adhesion-promoting layer of nickel
3. Preparing for the next step
4. Electrolytic deposition of a white bronze alloy layer
5. or electrolytic deposition of a yellow bronze alloy layer
6. or electrolytic deposition of a white+yellow bronze alloy layer
7. Preparing for the next step
8. Deposition of a passivation/anti-tarnish protection/topcoat
9. Post-processing, drying.

It is advantageous that steps for electrolytic cleaning, degreasing, rinsing and activation of the respective base for deposition are included in the deposition of the layer sequence according to the invention. Thus, the preparation steps in the method step just mentioned can comprise these activities. Preferably, the preparation for the next electrolytic step is as follows:
rinsing in an economizing rinse
repeated rinsing in water, preferably in a cascade rinsing technique
finally, drying of the obtained articles coated with bronze alloy is carried out.

According to the invention, the term "electrolytic" means that the process is carried out using external power sources (e.g. electrolytically).

Further information on execution:

1st Step:
For pre-cleaning; acid cleaner, e.g. Umicore Cleaner 865, from Umicore Galvanotechnik (https://ep.umicore.com/storage/ep/umicoregt-list-of-products-april-2021.pdf)
Components:
Umicore Cleaner 865 concentrate: 30 ml/l g/l (20-40 ml/l)
Working Conditions:
pH 1-2;
Temperature 35° C. (25-40° C.)
For copper activation: copper micro etchants;
e.g. Umicore Micro-Etch 910, from Umicore Galvanotechnik (https://ep.umicore.com/storage/ep/umicoregt-list-of-products-april-2021.pdf)
Components:
Umicore Micro-Etch 910 salt mixture 50 g/l (40-60 g/l).
Further components according to manufacturer's instructions as per instruction sheet.
Working Conditions:
pH approx. 1-2;
Temperature 25° C. (25-35° C.)

2nd Step:
To produce the adhesion-promoting nickel layer:
E.g. Umicore NIRUNA 808 (https://ep.umicore.com/storage/ep/umicoregt-list-of-products-april-2021.pdf)
Components:
NIRUNA 808 Make-up concentrate: nickel 80 g/l (75-85 g/l)
Nickel chloride 8 g/l (6-10 g/l)
Boric acid 45 g/l (42-48 g/l). Further components according to manufacturer's instructions as per instruction sheet.
Working Conditions:
pH 3.8 (3.5-4.1)
Temperature 57° C. (55-59° C.)
Current density 5 A/dm$^2$ (2-8 A/dm$^2$)

3rd Step:
For alkaline cleaning, e.g. Umicore Cleaner 6032, from Umicore Galvanotechnik (https://ep.umicore.com/storage/ep/umicoregt-list-of-products-april-2021.pdf)
Components:
Make-up salt 60 g/l (50-100 g/l)
Further components according to manufacturer's instructions as per instruction sheet.
Working Conditions:
pH 11.5 (10-13)
Temperature 55° C. (40-60° C.)
Current density 12 A/dm$^2$ (5-15 A/dm$^2$)

4th-6th Steps:

Method for applying a bronze layer as a gold or palladium substitute

The following methods:

To produce a bronze layer similar to gold, e.g. MIRAL-LOY® 2847 1N HS, Umicore Galvanotechnik (https://ep.umicore.com/storage/ep/umicoregt-list-of-products-april-2021.pdf)

Components:
MIRALLOY zinc salt 1 6.25 g/l
MIRALLOY copper salt 1 25.4 g/l
MIRALLOY tin salt 2 67 g/l
Further components according to manufacturer's instructions as per instruction sheet.

Working Conditions:
pH value: alkaline
Temperature 60° C. (58-62° C.)
Current density 9 A/dm$^2$ (7-10 A/dm$^2$)

To produce a bronze layer similar to palladium, e.g. MIRALLOY® 2841 HS, from Umicore Galvanotechnik (https://ep.umicore.com/storage/ep/umicoregt-list-of-products-april-2021.pdf)

Components:
MIRALLOY tin salt 2 69 g/l
MIRALLOY zinc salt 1 3.375 g/l
MIRALLOY copper salt 1 14.8 g/l
Further components according to manufacturer's instructions as per instruction sheet.

Working Conditions:
pH value: alkaline
Temperature 60° C. (58-62° C.)
Current density 4 A/dm$^2$ (3-4 A/dm$^2$)

7th Step:

For alkaline cleaning, e.g. Umicore Cleaner 6032, from Umicore Galvanotechnik (https://ep.umicore.com/storage/ep/umicoregt-list-of-products-april-2021.pdf)

Components:
Make-up salt 60 g/l (50-100 g/l)
Further components according to manufacturer's instructions as per instruction sheet.

Working Conditions:
pH 11.5 (10-13)
Temperature 55° C. (40-60° C.)
Current density 12 A/dm$^2$ (5-15 A/dm$^2$)

8th Step:

Method for applying passivation, anti-tarnish protection or topcoat, e.g. Umicore Sealing 692 EL (https://ep.umicore.com/storage/ep/umicoregt-list-of-products-april-2021.pdf)

Components:
Umicore Sealing 692 concentrate 10 ml/l (2-50 ml/l)
Further components according to manufacturer's instructions as per instruction sheet.

Working Conditions:
pH 9.5 (9-10)
Temperature 55° C. (53-57° C.)
Voltage 3 V (2.0-4.0 V)

The method steps between the individual process steps are generally rinsing processes with water of appropriate quality.

The invention claimed is:

1. A layer sequence comprising two successive, electrolytically deposited bronze layers, and at least one metallic underlayer, wherein one of the electrolytically deposited bronze layers has the following composition:
Cu 45-60 wt %, Sn 30-50 wt %, and Zn 5-15 wt % of the given layer;
and the other of these two layers has the following composition:
Cu 70-90 wt %, Sn 1-10 wt %, and Zn 5-30 wt % of the given layer,
wherein the at least one metallic underlayer, upon which one of the electrolytically deposited bronze layers is deposited, is a nickel layer.

2. The layer sequence according to claim 1, wherein one or both of the electrolytically deposited bronze layers each have a thickness of 0.1-2 μm.

3. The layer sequence according to claim 1, wherein the at least one metallic underlayer comprises a nickel layer deposited on a copper layer.

4. A smart card comprising
a leadframe having an outer contact surface; and
electrolytically deposited bronze layers deposited on the outer contact surface, wherein the electrolytically deposited bronze layers comprise two successive, electrolytically deposited bronze layers, wherein one of the electrolytically deposited bronze layers has the following composition:
Cu 45-60 wt %, Sn 30-50 wt %, and Zn 5-15 wt % of the given layer;
and the other of these two layers has the following composition:
Cu 70-90 wt %, Sn 1-10 wt %, and Zn 5-30 wt % of the given layer.

5. The smart card according to claim 4, wherein one or both of the electrolytically deposited bronze layers each have a thickness of 0.1-2 μm.

6. The smart card according to claim 4, and further comprising at least one metallic underlayer upon which the electrolytically deposited bronze layers are deposited.

7. The smart card according to claim 6, wherein the at least one metallic underlayer is selected from the group consisting of Cu, Ni, nickel-phosphorus, Pd, PdNi, Au, and platinum.

8. The smart card according to claim 6, wherein the at least one metallic underlayer, upon which one of the electrolytically deposited bronze layers is deposited, is a nickel layer.

9. The smart card according to claim 6, wherein the at least one metallic underlayer comprises a copper layer.

10. The smart card according to claim 6, wherein the at least one metallic underlayer comprises a nickel layer deposited on a copper layer.

11. The smart card according to claim 4, wherein the smart card lacks galvanically deposited noble metal layers on the outer contact surface of the leadframe.

12. The smart card according to claim 4, wherein the smart card further comprises a microchip to which the leadframe and the electrolytically deposited bronze layers form an electrically conductive pathway thereto whereby the microchip is capable of being connected to a read/write device.

13. A method of providing an electrically conductive pathway between a microchip in a smart card and a read/write device, said smart card comprises a leadframe having an outer contact surface, which comprises
electrolytically depositing two successive bronze layers as the uppermost layers on the outer contact surface, wherein one of the electrolytically deposited bronze layers has the following composition:
Cu 45-60 wt %, Sn 30-50 wt %, and Zn 5-15 wt % of the given layer;
and the other of these two layers has the following composition:

Cu 70-90 wt %, Sn 1-10 wt %, and Zn 5-30 wt % of the given layer.

14. The method according to claim 13, wherein one or both of the electrolytically deposited bronze layers each have a thickness of 0.1-2 μm.

15. The method according to claim 13, which further comprises providing on the outer contact surface at least one metallic underlayer upon which the electrolytically deposited bronze layers are deposited.

16. The smart card according to claim 15, wherein the at least one metallic underlayer is selected from the group consisting of Cu, Ni, nickel-phosphorus, Pd, PdNi, Au, and platinum.

\* \* \* \* \*